(12) United States Patent
Fujise et al.

(10) Patent No.: US 7,700,674 B2
(45) Date of Patent: Apr. 20, 2010

(54) VINYLPYRROLIDONE-BASED POLYMER COMPOSITION

(75) Inventors: Keiichi Fujise, Kyoto (JP); Itsuko Hamaguchi, Kyoto (JP); Akio Naka, Suita (JP); Daijyo Tomihisa, Moriguchi (JP)

(73) Assignees: Nippon Shokubai Co., Ltd., Osaka (JP); Dai-Chj Kogyo Seiyaki Co., Ltd., Kyoto (JP)

( * ) Notice: Subject to any disclaimer, the term of this patent is extended or adjusted under 35 U.S.C. 154(b) by 258 days.

(21) Appl. No.: 11/888,113

(22) Filed: Jul. 31, 2007

(65) Prior Publication Data

US 2008/0033081 A1 Feb. 7, 2008

(30) Foreign Application Priority Data

Aug. 1, 2006 (JP) .............................. 2006-210017

(51) Int. Cl.
*C08F 26/10* (2006.01)
(52) U.S. Cl. ..................................... 524/104; 524/195
(58) Field of Classification Search ................ 524/104, 524/195
See application file for complete search history.

(56) References Cited

FOREIGN PATENT DOCUMENTS

JP        2003-138087        5/2003

*Primary Examiner*—Robert D. Harlan
(74) *Attorney, Agent, or Firm*—Jordan and Hamburg LLP

(57) ABSTRACT

Disclosed is a vinylpyrrolidone-based polymer composition which has improved storage stability and of which the reduction in the molecular weight (K value) under shear stress is small. The composition comprises a vinylpyrrolidone-based polymer and contains from 1 to 10000 ppm of at least one compound selected from a group consisting of biguanides and further contains from 1000 to 30000 ppm of 2-pyrrolidone and from 1 to 5000 ppm of ammonia.

7 Claims, No Drawings

VINYLPYRROLIDONE-BASED POLYMER COMPOSITION

BACKGROUND OF THE INVENTION

The present invention relates to a vinylpyrrolidone-based polymer composition, more precisely to a vinylpyrrolidone-based polymer composition which has improved storage stability and of which the reduction in the molecular weight (K value) under shear stress is small.

A vinylpyrrolidone-based polymer (PVP) such as polyvinylpyrrolidone and vinylpyrrolidone copolymer has characteristics of biocompatibility, safety and hydrophilicity, and is therefore widely used for substrates for cosmetics and for binders for medicines.

In general, PVP is obtained through solution polymerization, and it may be stored directly as its solution or, after dried and ground, it may be stored as a solid. However, irrespective of its morphology, it is known that the storage stability of PVP is generally poor; and for example, when it is stored for a long period of time or at a high temperature, it has a problem in that its physical properties such as molecular weight may change with time.

In case where solid PVP is ground and used as its powder, its molecular weight may lower when large shear stress is applied to PVP in its grinding step, and therefore the grinding condition is limited and the powdering capability and the grinding efficiency may be thereby worsened. Regarding solution PVP, for example, when an emulsion of an aqueous PVP solution is prepared, it requires high-speed stirring; however, it is problematic in that the molecular weight of PVP shall lower under shear stress during high-speed stirring, and the emulsion therefore could not have the necessary viscosity.

For improving the storage stability of the above PVP, JP-A 2003-138087 discloses a technique of adding any of guanidines or biguanides to PVP.

According to the technique described in JP-A 2003-138087, they say that adding any of guanidines and/or biguanides to PVP improves the stability of PVP, therefore improving the storage stability thereof; however, the technique is still ineffective for preventing the reduction in the molecular weight of PVP under stress given thereto during grinding and stirring it.

BRIEF SUMMARY OF THE INVENTION

The present invention has been made in consideration of the above-mentioned situation, and its object is to provide a vinylpyrrolidone-based polymer composition capable of improving the stability of PVP therein and preventing the reduction in the molecular weight (K value) of the polymer under shear stress.

We, the present inventors have assiduously investigated the phenomenon of molecular weight reduction of PVP under shear stress, and as a result, have found that adding 2-pyrrolidone and ammonia to the polymer is effective for preventing the molecular weight reduction of the polymer, or that is, for preventing the K value reduction thereof, and that, for solid PVP, the oxygen concentration in the vapor phase has an influence on the molecular weight reduction thereof; and on the basis of these findings, we have completed the present invention.

Specifically, the vinylpyrrolidone-based polymer composition of the invention comprises a vinylpyrrolidone-based polymer, and contains from 1 to 10000 ppm of at least one compound selected from a group consisting of biguanides and further contains from 1000 to 30000 ppm of 2-pyrrolidone and from 1 to 5000 ppm of ammonia.

The vinylpyrrolidone-based polymer composition may contain at least one compound selected from a group consisting of guanidines in an amount of from 1 to 10000 ppm as a total thereof with the biguanide in the composition.

The vinylpyrrolidone-based polymer composition of the invention comprises a vinylpyrrolidone-based polymer, and contains at least one compound selected from a group consisting of biguanides and further contains 2-pyrrolidone and ammonia, and it exists in a space having an oxygen concentration in the vapor phase of at most 5%.

The vinylpyrrolidone-based polymer composition may further contain at least one compound selected from a group consisting of guanidines.

The vinylpyrrolidone-based polymer composition of the invention is significantly effective for preventing the reduction in the K value of the polymer, relative to the K value of the vinylpyrrolidone-based polymer of at least 80.

DETAILED DESCRIPTION OF THE INVENTION

Some embodiments of the vinylpyrrolidone-based polymer composition (PVP composition) of the invention, which comprises PVP as the essential ingredient thereof, are described hereinunder.

PVP for use in the invention is a homopolymer of vinylpyrrolidone (in general, N-vinyl-2-pyrrolidone) or a copolymer of vinylpyrrolidone with any other polymerizable monomer; and for example, it may be obtained according to a conventional known production method of solution polymerization with a radical polymerization initiator.

Not specifically defined, the polymerizable monomer capable of copolymerizing with vinylpyrrolidone may be any one, including, for example, acrylic acid, methacrylic acid, alkyl acylates (e.g., methyl acrylate, ethyl acrylate), alkyl methacrylates (e.g., methyl methacrylate, ethyl methacrylate), aminoalkyl acrylates (e.g., diethylaminoethyl acrylate), aminoalkyl methacrylates, monoesters of acrylic acid and glycol, monoesters of methacrylic acid and glycol (e.g., hydroxyethyl methacrylate), alkali metal acrylates, alkali metal methacrylates, ammonium acylate, ammonium methacrylate, quaternary ammonium derivatives of aminoalkyl acrylates, quaternary ammonium derivatives of aminoalkyl methacrylates, quaternary ammonium compounds of diethylaminoethyl acrylate and methyl sulfate, vinyl methyl ether, vinyl ethyl ether, alkali metal vinylsulfonates, ammonium vinylsulfonate, styrenesulfonic acid, styrenesulfonates, allylsulfonic acid, allylsulfonates, methallylsulfonic acid, methallylsulfonates, vinyl acetate, vinyl stearate, N-vinylimidazole, N-vinylacetamide, N-vinylformamide, N-vinylcaprolactam, N-vinylcarbazole, acrylamide, methacrylamide, N-alkylacrylamides, N-methylolacrylamide, N,N-methylenebisacrylamide, glycol diacrylate, glycol dimethacrylate, divinylbenzene, glycol diallyl ether, etc. Either singly or as combined, one or more of these may be copolymerized with vinyl pyrrolidone.

Not specifically limited, the proportion of vinylpyrrolidone in the vinylpyrrolidone copolymer is preferably at least 0.1 mol % of the overall monomer component, more preferably at least 5 mol %, even more preferably at least 20 mol %. When the proportion of vinylpyrrolidone in the copolymer is less than 0.1 mol %, then the PVP composition could not exhibit its emulsifying effect.

Preferably, the K value of PVP for use in the invention is at least 80. The effect of the invention to prevent the reduction in the K value of PVP is especially remarkable for PVP having a large molecular weight, or that is, having a K value of at least 80. The K value is a value obtained according to the following formula (1) that indicates a molecular weight of a polymer as proposed by Fikentshcer:

$$K \text{ value} = [\{300C \log Z + (C + 1.5C \log Z)2\}1/2 + 1.5C \log Z - C]/(0.15C + 0.003C2) \quad (1)$$

In this, C means the concentration (%: g/100 ml), and Z means the relative viscosity (hrel) of the solution having the concentration C.

The PVP composition of the invention contains at least one compound selected from a group consisting of biguanides, and may further contain at least one compound selected from a group consisting of guanidines. Accordingly, PVP may be stabilized and the storage stability of the PVP composition may be thereby improved.

The guanidines include, for example, guanidine, or guanidine salts such as guanidine hydrochloride, guanidine nitrate, guanidine carbonate, guanidine phosphate, guanidine sulfamate; and aminoguanidine and aminoguanidine salts such as aminoguanidine hydrochloride, aminoguanidine bicarbonate.

The biguanides include, for example, biguanide or its salts; phenylbiguanide or its salts; polyhexamethylene-biguanidine or its salt; chlorohexidine, or chlorohexidine salts such as chlorohexidine gluconate. Of those, especially preferred is polyhexamethylene-biguanidine hydrochloride.

The content of biguanides is from 1 to 10000 ppm of PVP, preferably from 5 to 4000 ppm. In case where the biguanides are combined with guanidines, their content may be from 1 to 10000 ppm of PVP in terms of the total of biguanides and guanidines, preferably from 5 to 4000 ppm. When the content is less than 1 ppm, then the composition could not have an effect of stabilization and therefore its storability may lower; but even though the content is more than 10000 ppm, the composition could not have any further improved effect, but on the contrary, the additives may be rather impurities. Either singly or as combined, one or more of those guanidines and biguanides may be used added to the composition.

The PVP composition of the invention further contains 2-pyrrolidone and ammonia in addition to biguanides or a mixture of biguanides and guanidines, whereby the reduction in the K value of PVP under shear stress, or that is, the reduction in the molecular weight thereof may be prevented.

In the invention, the content of 2-pyrrolidone relative to PVP is from 1000 to 30000 ppm. When the content is less than 1000 ppm, then the composition may be ineffective for keeping the K value of the polymer therein under shear stress; but when it is more than 30000 ppm, the additive may be rather an impurity. 2-Pyrrolidone may be added to the composition, or a side product after polymerization may be used for it to be in the composition.

The content of ammonia relative to PVP is from 1 to 5000 ppm, preferably from 1 to 1000 ppm. When the content is less than 1 ppm, then the composition may be ineffective for preventing the K-value reduction; but when it is more than 5000 ppm, the additive may be rather an impurity and may have a negative influence on the properties of the PVP composition.

When it is solid, the PVP composition of the invention is preferably in a space having an oxygen concentration in the vapor phase of at most 5%. Kept under the condition, the K value of the PVP composition may be prevented from lowering.

Specifically, it is important that the PVP composition comprises a solid PVP and contains at least one biguanide, or at least one of biguanides and guanidines and further contains 2-pyrrolidone and ammonia, and that the composition exists in a space having an oxygen concentration in the vapor phase of at most 5%.

The lowermost limit of the oxygen concentration in the vapor phase is not specifically defined, and even though the concentration is low, the composition may exhibit its effect; however, when the concentration is more than 5%, then its effect of preventing the reduction in the K value of the polymer under shear stress may lower.

In this case, the content of biguanides, that of a mixture of biguanides and guanidines, the content of 2-pyrrolidone and that of ammonia are not specifically defined; preferably, however, the content does not overstep the range of the content of each compound mentioned hereinabove. Concretely, the content of biguanides is preferably from 1 to 10000 ppm of PVP, more preferably from 5 to 4000 ppm. In case where biguanides and guanidines are combined, their content is preferably from 1 to 10000 ppm of PVP in terms of the total content of biguanides and guanidines, more preferably from 5 to 4000 ppm. The content of 2-pyrrolidone is preferably from 1000 to 30000 ppm; and the content of ammonia is preferably from 1 to 5000 ppm. In particular, when the content of each additive oversteps the uppermost limit, then the additives may be impurities and may have some negative influences on the properties of the PVP composition.

The vapor phase as referred to herein is a part of the space in which the PVP composition exists, except the solid phase part and/or the liquid phase part that the composition occupies; and the oxygen concentration in the vapor phase means the absolute amount of oxygen in the vapor phase of a unit volume. For example, in case where the PVP composition is housed in a closed container, the oxygen concentration in the vapor phase is the proportion of the volume of oxygen in the vapor phase in the container under normal pressure, to the vapor phase capacity in the container. The oxygen concentration may be determined in a simplified manner, for example, using a commercially-available oxygen concentration gauge, such as a galvanic cell diffusion-type device or a zirconia sensor-type device.

In order to make the PVP composition exist in a space having an oxygen concentration in the vapor phase of at most 5%, the composition may be housed in a closed container kept in vacuum, or may be housed in a closed container filled with an inert gas, or may be housed in a closed container with an oxygen scavenger put therein.

EXAMPLES

The invention is described in detail hereinunder with reference to its Examples and Comparative Examples, which, however, are not intended to restrict the scope of the invention.

Various PVPs having a different K value were used. In the blend ratio as in Table 1, polyhexamethylene-biguanide hydrochloride, guanidine carbonate, 2-pyrrolidone and ammonia were added to PVP, thereby preparing PVP compositions of Examples and Comparative Examples. The liquid PVP compositions were tested in a high-speed stirring test; and the solid (flaky) PVP compositions were tested in a grinding test under a severe condition. Before and after the test, the K value of the composition was measured, thereby checking for the molecular weight change thereof. The test methods are mentioned below.

The liquid PVP to be tested in the high-speed stirring test is an aqueous 30% solution prepared by adding various additives to PVP and mixing them. The solid (flaky) PVP to be tested in the grinding test was prepared by adding various additives to the aqueous 30% solution and mixing them, and thereafter drying the mixture with a hot plate at 140° C. so that the dried mixture could have a water content of at most 5%. The ammonia content of the dried mixture was measured through ion chromatography.

[Stirring, Grinding Test Method]

High-Speed Stirring Test: Using a high-speed emulsifying disperser (T.K. Homomixer, MARKII f model, by Tokushu Kika Kogyo Kabushiki Kaisha), the sample was rapidly stirred at 12,000 rpm for 20 minutes. Before and after the test, the K value of the sample was measured.

Grinding Test: Using a small-size grinder (mill) (SM-1, by AS ONE Kabushiki Kaisha), the sample was ground at 14,000 rpm for 15 minutes, purged with nitrogen and sealed up. Before and after the test, the K value of the sample was measured.

The K value measurement is as follows: An aqueous 1% solution of the PVP composition is analyzed with a capillary viscometer at 25° C., and its relative viscosity thus measured is applied to the above-mentioned Fikentshcer formula (1), and the K value of the sample is computed.

The K value reduction of at most 1 means that the molecular weight change of the sample is small. The samples of which the K value reduction is at most 1 are good; and those of which the K value reduction is 2 or more are not good. The results are shown in Table 1.

TABLE 1

|  |  | Example 1 | Example 2 | Comparative Example 1 | Comparative Example 2 | Comparative Example 3 |
| --- | --- | --- | --- | --- | --- | --- |
| Guanidine Carbonate | ppm | 200 | 0 | 600 | 0 | 40000 |
| Polyhexamethylene-biguanide Hydrochloride | ppm | 200 | 10 | 0 | 10 | 0 |
| 2-Pyrrolidone | ppm | 12000 | 1000 | 5000 | 0 | 25000 |
| Ammonia | ppm | 1500 | 5 | 0 | 100 | 0 |
| Form of PVP Composition |  | aqueous solution | flakes | aqueous solution | flakes | flakes |
| Oxygen Concentration in Vapor Phase | % | — | 2 | — | 2 | 10 |
| Processing Method |  | stirring | grinding | stirring | grinding | grinding |
| K Value before treatment |  | 83 | 95 | 88 | 98 | 92 |
| K Value after treatment |  | 83 | 95 | 83 | 90 | 86 |
| K Value Reduction through treatment |  | 0 | 0 | 5 | 8 | 6 |
| Evaluation |  | good | good | not good | not good | not good |

As in Table 1, the PVP compositions of Examples 1 and 2 of the invention kept their molecular weight with no reduction in the K value thereof even after processed for high-speed stirring or grinding under severe condition. As opposed to these, the K value reduction under shear stress in Comparative Examples 1 and 2 not containing 2-pyrrolidone or ammonia and in Comparative Example 3 kept in a space having a high oxygen concentration in the vapor phase was large.

According to the invention, the storage stability of PVP may be improved and the K value reduction of PVP under shear stress may be prevented, and therefore, the processability and the handlability of PVP in grinding and stirring may be thereby improved. Accordingly, solid PVP may be readily powdered, and may be efficiently ground; and liquid PVP may be readily prepared through high-speed stirring. Using the vinylpyrrolidone-based polymer composition of the invention, powders and emulsions of cosmetics and medicines may be readily produced, and their producibility may be increased.

The vinylpyrrolidone-based polymer composition of the invention is useful, for example, as an emulsifier and a binder for cosmetics and medicines.

What is claimed is:

1. A vinylpyrrolidone-based polymer composition comprising a vinylpyrrolidone-based polymer and containing from 1 to 10000 ppm of at least one biguanidine compound selected from the group consisting of biguanidine, the acid addition salts of biguanidine, phenylbiguanidine, the acid addition salts of phenylbiguanidine, poly(hexamethylene biguanidine), the acid addition salts of poly(hexamethylene biguanidine), chlorohexidine, and the acid addition salts chlorohexidine; and further containing from 1000 to 30000 ppm of 2-pyrrolidone and from 1 to 5000 ppm of ammonia.

2. The vinylpyrrolidone-based polymer composition as claimed in claim 1, further comprising at least one compound selected from the group consisting of guanidine, guanidine hydrochloride, guanidine nitrate, guanidine carbonate, guanidine phosphate, guanidine sulfamate, amonoguanidine, aminoguanidine hydrochloride, and aminoguanidine bicarbonate in a combined amount of from 1 to 10000 ppm total with the biguanide compound.

3. A vinylpyrrolidone-based polymer composition comprising a vinylpyrrolidone-based polymer and containing at least one guanidine compound selected from the group consisting of biguanidine, the acid addition salts of biguanidine, phenylbiguanidine, the acid addition salts of phenylbiguanidine, poly(hexamethylene biguanidine), the acid addition salts of poly(hexamethylene biguanidine), chlorohexidine, and the acid addition salts chlorohexidine; and further containing 2-pyrrolidone and ammonia, which exists in a space having an oxygen concentration in the vapor phase of at most 5%.

4. The vinylpyrrolidone-based polymer composition as claimed in claim 3, which contains at least one compound selected from the group consisting of guanidine, guanidine hydrochloride, guanidine nitrate, guanidine carbonate, guanidine phosphate, guanidine sulfamate, amonoguanidine, aminoguanidine hydrochloride, and aminoguanidine bicarbonate.

5. The vinylpyrrolidone-based polymer composition as claimed in any of claims 1 to 4, wherein the K value of the vinylpyrrolidone-based polymer is at least 80.

6. The vinylpyrrolidone-base polymer composition of claim 1 wherein the acid addition salts are the hydrochloride salts.

7. The vinylpyrrolidone-base polymer composition of claim 3 wherein the acid addition salts are the hydrochloride salts.

* * * * *